United States Patent
An et al.

(10) Patent No.: US 9,548,870 B2
(45) Date of Patent: Jan. 17, 2017

(54) MOBILE TERMINAL AND METHOD FOR CONTROLLING SAME

(71) Applicant: LG ELECTRONICS INC., Seoul (KR)

(72) Inventors: Sungje An, Seoul (KR); Seungman Kim, Seoul (KR); Jeongeun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/412,961

(22) PCT Filed: Jul. 4, 2013

(86) PCT No.: PCT/KR2013/005957
§ 371 (c)(1),
(2) Date: Jan. 5, 2015

(87) PCT Pub. No.: WO2014/010874
PCT Pub. Date: Jan. 16, 2014

(65) Prior Publication Data
US 2015/0207644 A1  Jul. 23, 2015

Related U.S. Application Data

(60) Provisional application No. 61/669,497, filed on Jul. 9, 2012.

(51) Int. Cl.
*H04L 12/28* (2006.01)
*G01C 21/36* (2006.01)
(Continued)

(52) U.S. Cl.
CPC ......... *H04L 12/2816* (2013.01); *G01C 21/362* (2013.01); *G06Q 30/0601* (2013.01);
(Continued)

(58) Field of Classification Search
CPC .................... H04L 12/2816; H04L 2012/2841; H04L 2012/285

USPC ......................................................... 455/420
See application file for complete search history.

(56) References Cited

U.S. PATENT DOCUMENTS

2007/0152048 A1  7/2007  Jung et al.
2008/0228600 A1  9/2008  Treyz et al.
(Continued)

FOREIGN PATENT DOCUMENTS

JP       2002-083153      3/2002
KR   10-2007-0071420      7/2007
(Continued)

OTHER PUBLICATIONS

PCT International Application No. PCT/KR2013/005957, Written Opinion of the International Searching Authority dated Sep. 27, 2013, 1 page.

(Continued)

*Primary Examiner* — Michael Neff
(74) *Attorney, Agent, or Firm* — Lee, Hong, Degerman, Kang & Waimey

(57) ABSTRACT

The present invention relates to a mobile terminal capable of controlling a navigation device and to a method for controlling same. The method for controlling the mobile terminal includes the steps of: receiving home information generated by home appliances, which includes product information; outputting the received home information to a display unit and detecting purchase reservation commands for the products; searching for a navigation device positioned on a predetermined street in response to the purchase reservation commands; and transmitting destination setting commands to the navigation device, together with the home information, in order to allow a found navigation device to set a destination related to the products.

19 Claims, 13 Drawing Sheets

(51) Int. Cl.
    *G06Q 50/10*    (2012.01)
    *G06Q 30/06*    (2012.01)
    *H04W 4/00*    (2009.01)
    *H04W 4/02*    (2009.01)
    *H04W 8/00*    (2009.01)
    *H04W 8/24*    (2009.01)

(52) U.S. Cl.
    CPC ......... *G06Q 30/0633* (2013.01); *G06Q 50/10* (2013.01); *H04L 12/2823* (2013.01); *H04W 4/008* (2013.01); *H04W 4/02* (2013.01); *H04W 8/005* (2013.01); *H04W 8/24* (2013.01); *H04L 2012/285* (2013.01); *H04L 2012/2841* (2013.01)

(56) References Cited

U.S. PATENT DOCUMENTS

| | | |
|---|---|---|
| 2009/0171574 A1 | 7/2009 | Ishibashi et al. |
| 2011/0070837 A1 | 3/2011 | Griffin et al. |
| 2012/0179547 A1* | 7/2012 | Besore ............... G06Q 30/0261 705/14.58 |
| 2013/0325568 A1* | 12/2013 | Mangalvedkar ... G06Q 30/0269 705/14.4 |

FOREIGN PATENT DOCUMENTS

| | | |
|---|---|---|
| KR | 10-0776201 | 11/2007 |
| KR | 10-1136226 | 4/2012 |
| KR | 10-2012-0055007 | 5/2012 |

OTHER PUBLICATIONS

European Patent Office Application Serial No. 13816107.0, Search Report dated Jan. 5, 2016, 8 pages.

Office Action issued in European Application No. 13816107.0, Jun. 27, 2016, 7 pages.

* cited by examiner

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2013/005957, filed on Jul. 4, 2013, which claims the benefit of U.S. Provisional Application Ser. No. 61/669,497, filed on Jul. 9, 2012, the contents of which are all hereby incorporated by reference herein in their entirety.

TECHNICAL FIELD

The present disclosure relates to a mobile terminal, and more particularly, a mobile terminal capable of controlling a navigation device, and a control method thereof.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

On the back of the improvements, terminals are being developed as a means for supporting smart home automation (or domotics). Smart home refers to constructing networks among various devices or information appliances at home (hereinafter, referred to as 'home appliances'). In more detail, the smart home refers to constructing environments in which those home appliances are allowed to communicate with one another through wired or wireless networks in the home and to be accessible to one another through an Internet or the like out of the home. A terminal may output information generated from the home appliances and provides various functions for controlling the home appliances by use of such networks. Here, improvement of a method for utilizing the information generated from the home appliances is required.

DISCLOSURE OF THE INVENTION

Therefore, to obviate those problems, an aspect of the detailed description is to provide a mobile terminal capable of controlling a navigation device using information generated by home appliances, and a control method thereof.

To achieve these and other advantages and in accordance with the purpose of the present invention, as embodied and broadly described herein, there is provided a control method for a mobile terminal, the method including
  receiving home information which includes information related to an article and is generated by at least one home appliance, outputting the received home information on a display unit and sensing a purchase reservation command for the article, searching for a navigation device located within a predetermined distance in response to the purchase reservation command, and transmitting a destination setting command, along with the home information to the searched navigation device, such that the searched navigation device sets a destination associated with the article.

In one embodiment disclosed herein, the control method may further include searching for the destination associated with the article, in response to the purchase reservation command. The destination setting command may include information related to the searched destination.

In one embodiment disclosed herein, the searching for the destination associated with the article may include calculating a location at which the navigation device has been searched for, and searching for the destination associated with the article based on the calculated location.

In one embodiment disclosed herein, the searched destination may be at least one destination. The at least one destination may be output on at least one of the display unit and the navigation device in an arranged state based on a distance from the calculated location.

In one embodiment disclosed herein, the control method may further include storing shop information related to the article. The searching for the destination associated with the article may be carried out to search for the destination associated with the article using the stored shop information.

In one embodiment disclosed herein, the home information may include an execution command for an application associated with the at least one home appliance, such that the application is executed.

In one embodiment disclosed herein, the application may be set to request for an input of the purchase reservation command upon being executed.

In one embodiment disclosed herein, the control method may further include generating a control command for controlling the at least one home appliance using the application.

In one embodiment disclosed herein, the control method may further include outputting a notification message to notify the reception of the home information in at least one of visual, tactile and audible manners, in response to the received home information.

In one embodiment disclosed herein, the destination setting command may be transmitted by a short-range communication module.

To achieve these and other advantages and in accordance with the purpose of the present invention, as embodied and broadly described herein, there is provided a mobile terminal including a display unit, a wireless communication unit that is configured to receive home information, which includes information related to an article and is generated by at least one home appliance, and a controller configured to output the received home information on the display unit, search for a navigation device located within a predetermined distance when a purchase reservation command for the article is sensed, and transmit a destination setting command along with the home information to the navigation device, such that the navigation device sets a destination associated with the article.

ADVANTAGEOUS EFFECT

In accordance with the detailed description, when home information generated from a home appliance is transmitted to a mobile terminal, the mobile terminal may generate a destination setting command using the home information and transmit the destination setting command to a searched navigation device. That is, the mobile terminal may output a list of articles necessary to purchase based on information generated from a home network and automatically set destinations associated with the list of articles, which may result in enhancement of user convenience.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
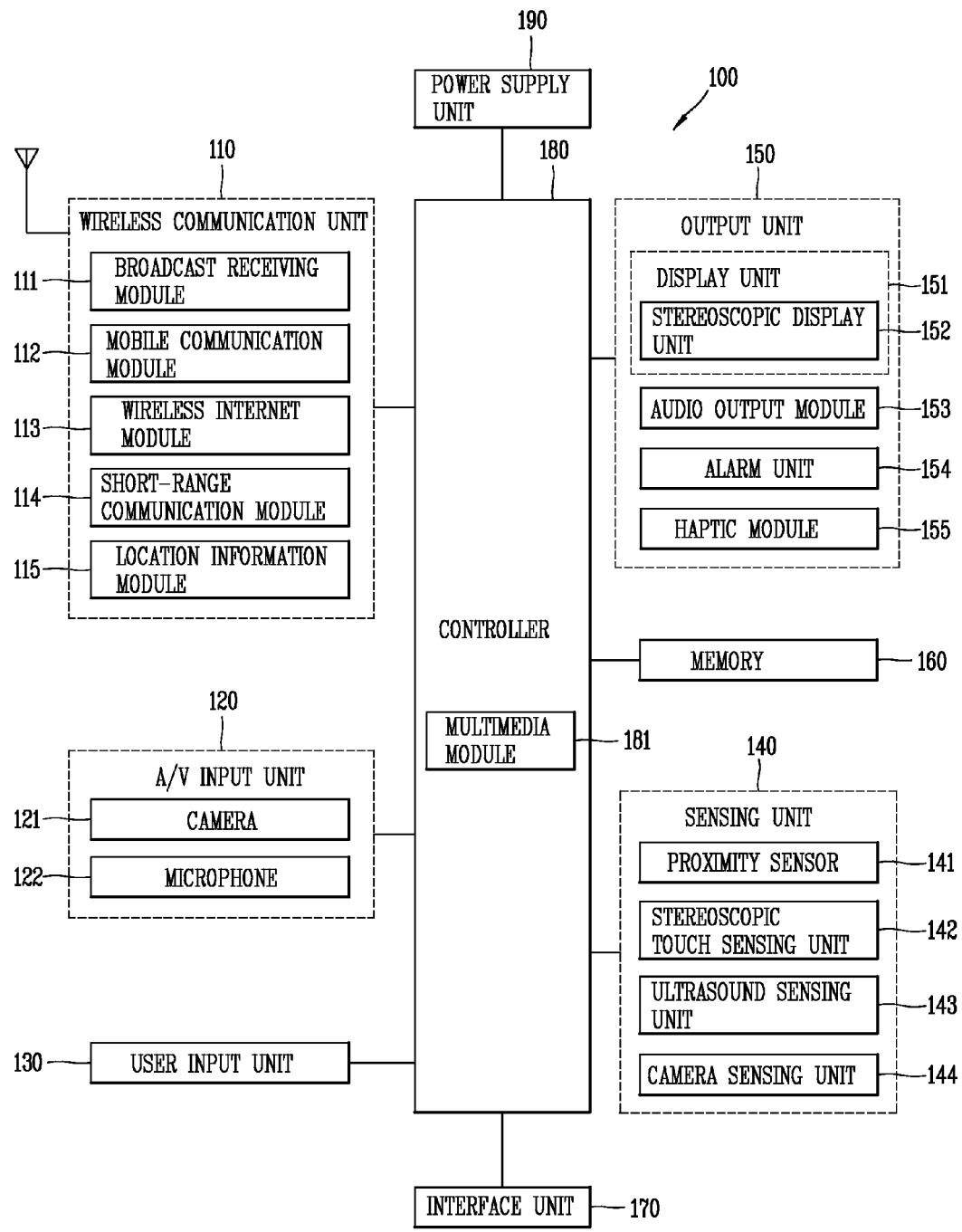
FIG. 1 is a block diagram of a mobile terminal in accordance with one exemplary embodiment of the present disclosure.

FIG. 1 is a block diagram of a mobile terminal in accordance with one exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of the broadcast associated information may include information associated with a broadcast channel, a broadcast program, a broadcast service provider, or the like. The broadcast associated information may also be provided via a mobile communication network, and, in this case, received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The mobile communication module 112 may implement a video (telephony) call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 denotes a module for wireless Internet access. This module may be internally or externally coupled to the mobile terminal 100. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Still referring to FIG. 1, the A/V input unit 120 may be configured to provide an audio or video signal input to the mobile terminal. The input unit 120 may include a camera 121 and a microphone 122. The camera 121 may receive and process image frames of still pictures or video obtained by image sensors in a video call mode or a capture mode. The processed image frames may be displayed on a display unit 151.

The image frames processed by the camera 121 may be stored in the memory 160 or transmitted to an external device via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal may then be processed into digital data. The processed digital data may be converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate data input by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal 100, a location of the mobile terminal 100, a presence or absence of user contact with the mobile terminal 100, an orientation of the mobile terminal 100, acceleration/deceleration of the mobile terminal 100, and the like, so as to generate a sensing signal for controlling the operation of the mobile terminal 100. For example, regarding a slide phone type mobile terminal, the sensing unit 140 may sense whether the slide phone type mobile terminal is open or closed. Other examples may include sensing statuses, the presence or absence of power provided by the power supply 190, the presence or absence of a coupling or other connection between the interface unit 170 and an external device, and the like.

The output unit 150 may be configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image. The 3D stereoscopic image refers to an image making a viewer feel that a gradual depth and reality of an object on a monitor or a screen is the same as a realistic space. The 3D stereoscopic image may be implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, may include Wheatstone stereoscopic scheme, or the like.

The auto-stereoscopic scheme may include, for example, a parallax barrier scheme, a lenticular scheme, an integral imaging scheme, a switchable lens, or the like. The projection scheme may include a reflective holographic scheme, a transmissive holographic scheme, and the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as a 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 may detect the distance between a sensing object (for example, the user's finger or a stylus pen), applying a touch by using the force of electromagnetism or infrared rays without a mechanical contact, and a detect surface. By using the distance, the terminal may recognize which portion of a stereoscopic image has been touched. In particular, when the touch screen is an electrostatic touch screen, the degree of proximity of the sensing object may be detected based on a change of an electric field according to proximity of the sensing object, and a touch to the 3D image may be recognized by using the degree of proximity.

The stereoscopic touch sensing unit 142 may be configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 may be configured to recognize position information relating to the sensing object by using ultrasonic waves.

The ultrasonic sensing unit 143 may include, for example, an optical sensor and a plurality of ultrasonic sensors. The optical sensor may be configured to sense light and the ultrasonic sensors may be configured to sense ultrasonic waves. Since light is much faster than ultrasonic waves, a time for which the light reaches the optical sensor may be much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 may include at least one of the camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor may be configured to scan a movement of the sensing object in proximity to the touch screen. In more detail, the photo sensor may include photo diodes and transistors at rows and columns to scan content mounted on the photo sensor by using an electrical signal changing according to the quantity of applied light. Namely, the photo sensor may calculate the coordinates of the sensing object according to variation of light to thus obtain position information of the sensing object.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible output signals related to a particular function (e.g., a call signal reception sound, a message reception sound, etc.) performed by the mobile terminal 100. The audio output module 153 may include a receiver, a speaker, a buzzer or the like.

The alarm unit 154 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 154 may output signals in a different manner, for example, using vibration to inform of an occurrence of an event. The video or audio signals may also be output via the display unit 151 and the audio output module 153. Hence, the display unit 151 and the audio output module 153 may be classified as parts of the alarm unit 154.

A haptic module 155 may generate various tactile effects the that user may feel. A typical example of the tactile effect generated by the haptic module 155 is vibration. Strength, pattern and the like of the vibration generated by the haptic module 155 may be controllable by a user selection or setting of the controller. For example, different vibrations may be combined to be outputted or sequentially outputted.

Besides vibration, the haptic module 155 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 155 may be implemented to allow the user to feel a tactile effect through a muscle sensation such as the user's fingers or arm, as well as transferring the tactile effect through a direct contact. Two or more haptic modules 155 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
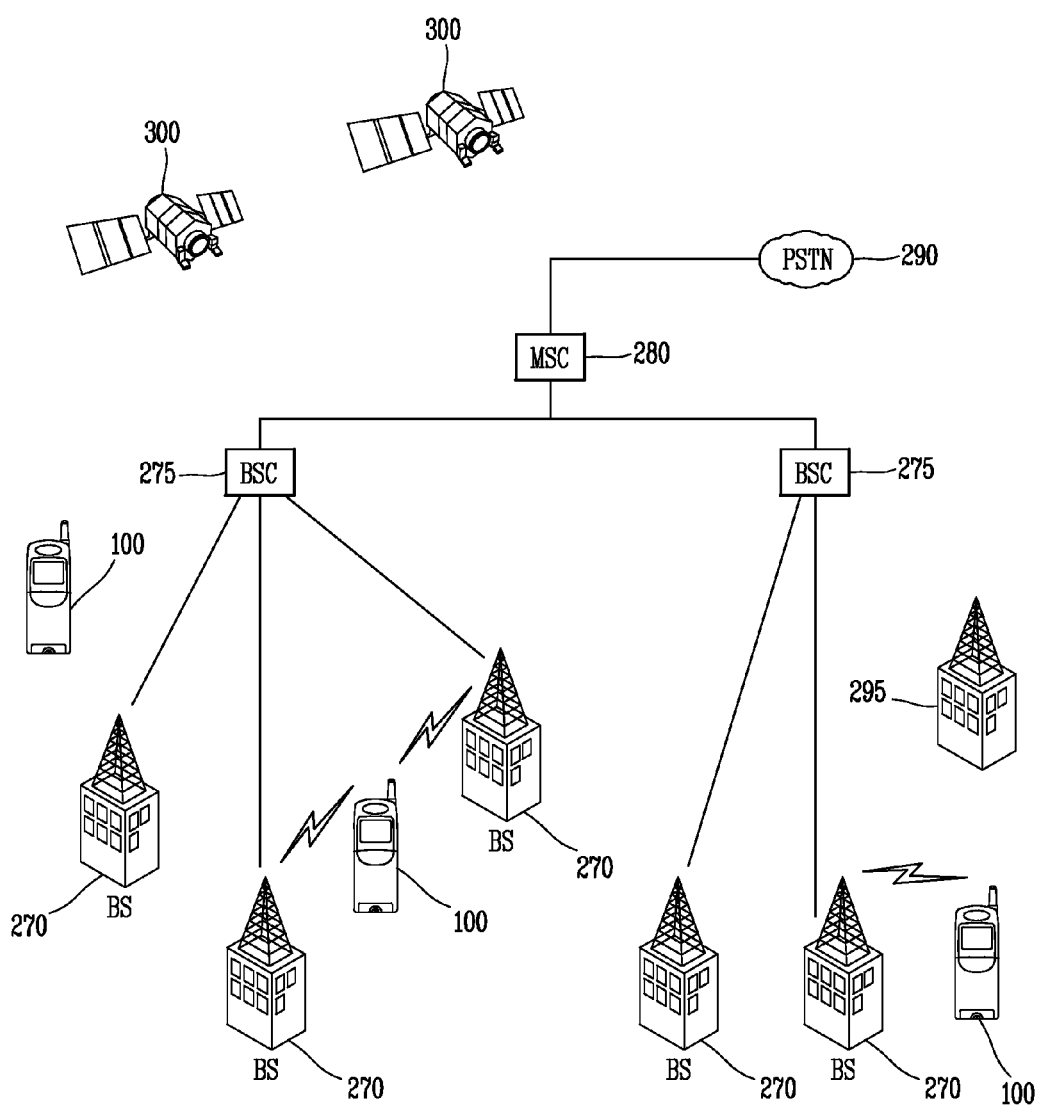
FIGS. 2A and 2B are conceptual views of a communication system operable with a mobile terminal in accordance with the present disclosure.
Figure 2B:
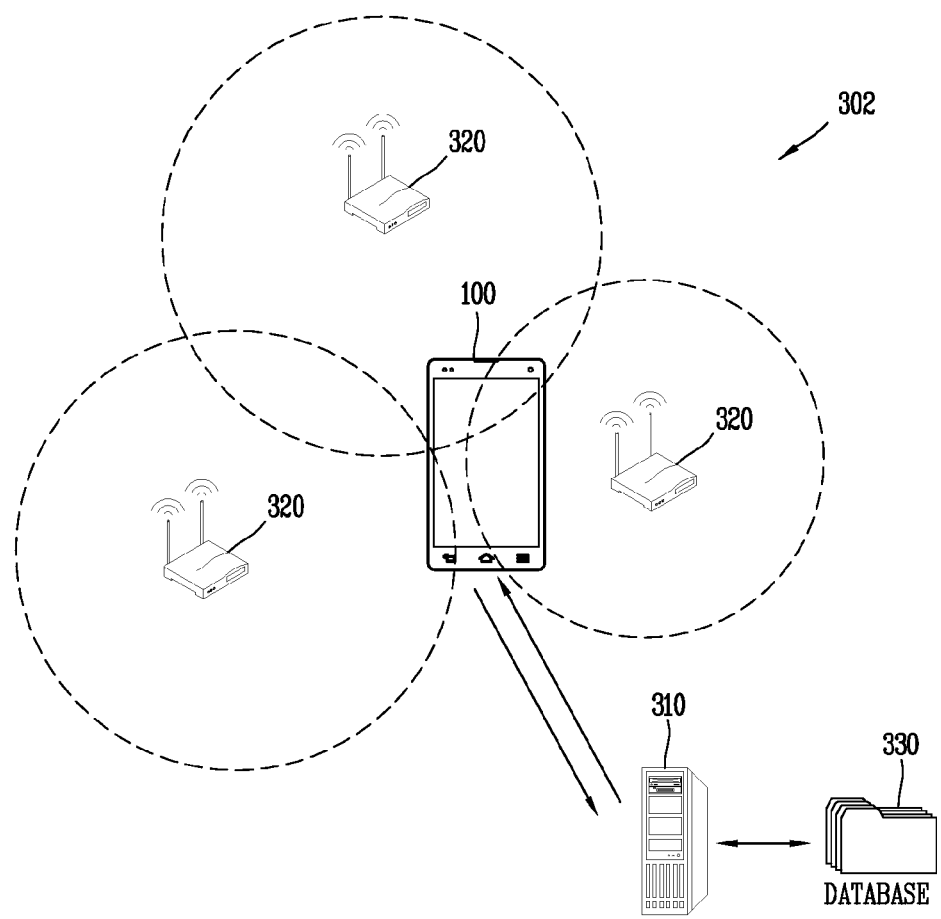

FIGS. 2A and 2B are conceptual views of a communication system operable with a mobile terminal 100 in accordance with the present disclosure.

First, referring to FIG. 2A, such communication systems may utilize different air interfaces and/or physical layers. Examples of such air interfaces utilized by the communication systems may include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings may be applied equally to other system types including the CDMA wireless communication system.

Referring now to FIG. 2A, a CDMA wireless communication system is shown having a plurality of mobile terminals 100, a plurality of base stations (BSs) 270, a plurality of base station controllers (BSCs) 275, and a mobile switching center (MSC) 280. The MSC 280 may be configured to interface with a conventional Public Switch Telephone Network (PSTN) 290. The MSC 280 may be configured to interface with the BSCs 275. The BSCs 275 may be coupled to the BSs 270 as a pair via backhaul lines. The backhaul lines may be configured in accordance with at least one of several known interfaces including, for example, E1/T1, ATM, IP, PPP, Frame Relay, HDSL, ADSL, or xDSL. Hence, the plurality of BSCs 275 may be included in the system as illustrated in FIG. 2A.

Each BS 270 may include one or more sectors, each sector having an omni-directional antenna or an antenna pointed in a particular direction radially away from the BS 270. Alternatively, each sector may include two or more different antennas. Each BS 270 may be configured to support a plurality of frequency assignments, with each frequency assignment having a particular spectrum (for example, 1.25 MHz, 5 MHz, etc.).

The intersection of sector and frequency assignment may be referred to as a CDMA channel. The BSs 270 may also be referred to as Base Station Transceiver Subsystems (BTSs). In some cases, the term "base station" may be used to refer collectively to one BSC 275 and at least one base station 270. The base stations may also be denoted as "cell sites." Alternatively, individual sectors of a given BS 270 may be referred to as cell sites.

A broadcasting transmitter (BT) 295, as illustrated in FIG. 2A, may transmit a broadcast signal to the mobile terminals 100 operating within the system. The broadcast receiving module 111 illustrated in FIG. 1 may be typically configured inside the mobile terminal 100 to receive broadcast signals transmitted by the BT 295.

FIG. 2A further depicts several Global Positioning System (GPS) satellites 300. Such satellites 300 may facilitate locating the position of at least one of plural mobile terminals 100. Two satellites are depicted in FIG. 2A, but it may be understood that useful position information may be obtained with greater or fewer satellites than two satellites. The location information module 115, for example, GPS module, illustrated in FIG. 1 may be typically configured to cooperate with the satellites 300 to obtain desired position information. It may be appreciated that other types of position detection technologies, in addition to or instead of GPS location technology, may alternatively be implemented. If desired, at least one of the GPS satellites 300 may alternatively or additionally be configured to provide satellite DMB transmissions.

During typical operation of the wireless communication system, the BSs 270 may receive sets of reverse-link signals from various mobile terminals 100. The mobile terminals 100 may be engaging in calls, messaging, and executing other communications. Each reverse-link signal received by a given BS 270 may be processed within that BS 270. The resulting data may be forwarded to a connected BSC 275. The BSC 275 may provide call resource allocation and mobility management functionality including the orchestration of soft handoffs between BSs 270. The BSCs 275 may also route the received data to the MSC 280, which may then provide additional routing services for interfacing with the PSTN 290. Similarly, the PSTN 290 may interface with the MSC 280, and the MSC 280 may interface with the BSCs 275, which may in turn control the BSs 270 to transmit sets of forward-link signals to the mobile terminals 100.

Hereinafter, description will be given of a method for acquiring location information of a mobile terminal using a Wireless Fidelity (WiFi) Positioning System (WPS), with reference to FIG. 2B.

The WiFi positioning system (WPS) 302 refers to a positioning technology based on a wireless local area network (WLAN) using WiFi as a technology for tracking the location of the mobile terminal 100 using a WiFi module provided in the mobile terminal 100 and a wireless access point (AP) 320 for transmitting and receiving to and from the WiFi module.

The WiFi positioning system 302 may include a WiFi location determination server 310, a mobile terminal 100, a wireless access point (AP) 320 connected to the mobile terminal 100, and a database 330 stored with any wireless AP information.

The WiFi location determination server 310 may extract the information about the wireless AP 320 connected to the mobile terminal 100 based on a location information request message (or signal) of the mobile terminal 100. Information related to the wireless AP 320 may be transmitted to the WiFi location determination server 310 through the mobile terminal 100 or transmitted to the WiFi location determination server 310 from the wireless AP 320.

The information related to the wireless AP extracted based on the location information request message of the mobile terminal 100 may be at least one of MAC address, SSID, RSSI, channel information, privacy, network type, signal strength and noise strength.

The WiFi location determination server 310 may receive the information of the wireless AP 320 connected to the mobile terminal 100 as described above, and compare the received wireless AP 320 information with information contained in the pre-established database 330 to extract (or analyze) the location information of the mobile terminal 100.

On the other hand, referring to FIG. 2B, as an example, wireless APs connected to the mobile terminal 100 are illustrated as first, second, and third wireless APs 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 302 can track the location of the mobile terminal 100.

Next, considering the database 330 stored with any wireless AP information in more detail, various information related to any wireless APs disposed at different locations may be stored in the database 330.

The information related to any wireless APs stored in the database 330 may be information such as a MAC address, SSID, RSSI, channel information, a privacy, a network type, latitude and longitude coordinates of the wireless AP, a building at which the wireless AP is located, a floor number, detailed indoor location information (GPS coordinates available), an AP owner's address, a phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the mobile terminal 100 from the database 330 and extract the location information matched with the retrieved wireless AP, thereby extracting location information related to the mobile terminal 100.

The extracted location information of the mobile terminal 100 may be transmitted to the mobile terminal 100 through the WiFi location determination server 310, such that the mobile terminal 100 can acquire the location information.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
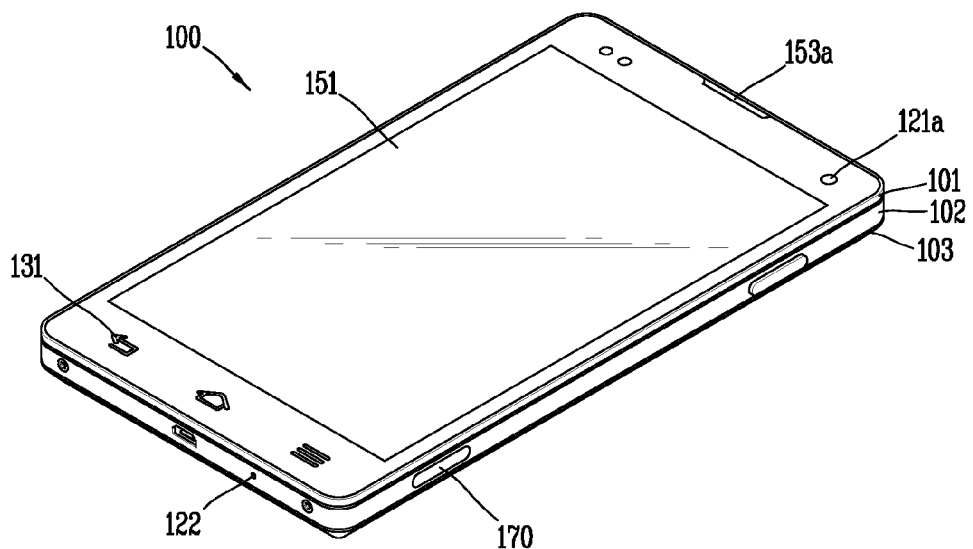
FIG. 3A is a front perspective view of one example of a mobile terminal in accordance with the present disclosure.

FIG. 3A shows a front surface and one side surface of the mobile terminal 100.

Referring to FIG. 3A, the mobile terminal 100 disclosed herein is provided with a bar-type terminal body. However, the present application is not limited to this type of terminal, but is also applicable to various structures of terminals such as folder type, flip type, slide type, swing type, swivel type, and the like, in which two or more bodies are combined with each other in a relatively movable manner.

A terminal body may include a case (or referred to as casing, housing, cover, etc.) defining an appearance of the electronic device 100. In this exemplary embodiment, the case may be divided into a front case 101 and a rear case 102. Various electronic components are installed in the space between the front case 101 and the rear case 102. At least one intermediate case may be additionally disposed between the front case 101 and the rear case 102. A battery cover 103 covering the battery 191 may be detachably coupled to the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
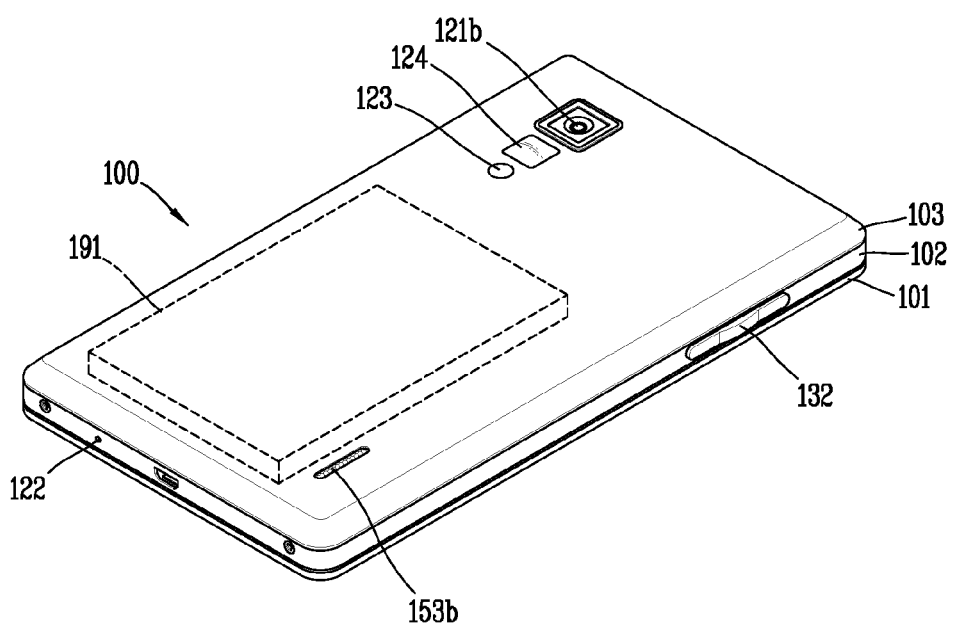
FIG. 3B is a rear perspective view of the mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Meanwhile, the controller of the mobile terminal 100 disclosed herein may generate a destination setting command using home information received from the wireless communication unit 110. The home information refers to information transmitted from home appliances. The destination setting command refers to a control command for controlling a navigation device located near the mobile terminal 100 to set a destination.

Hereinafter, a terminal system including the mobile terminal 100 will be described in detail with reference to FIG. 4.

Figure 4:
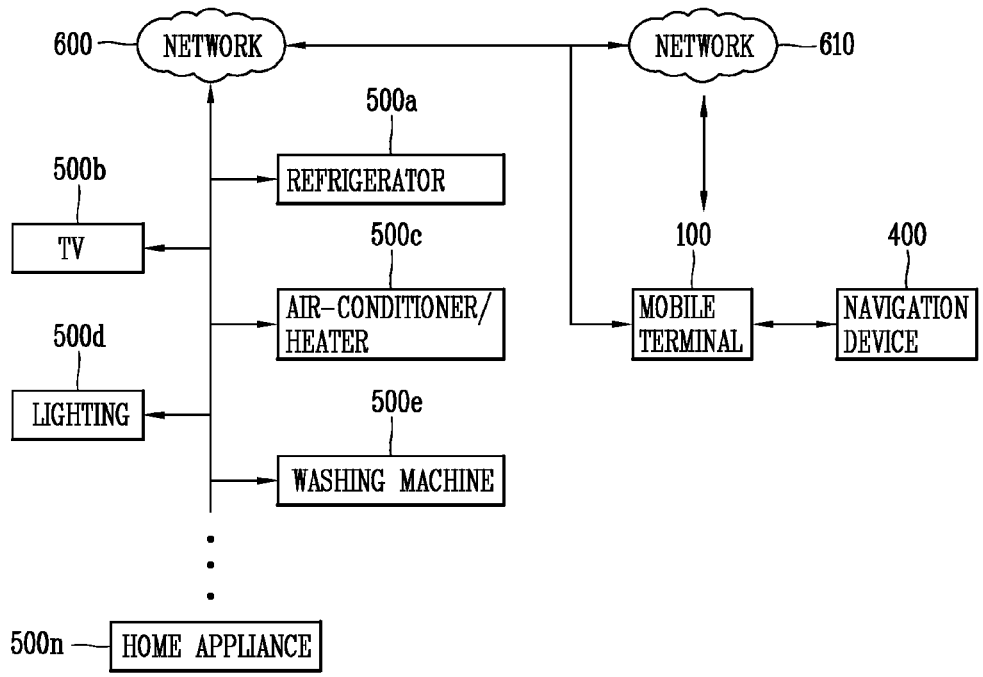
FIG. 4 is a conceptual view illustrating one embodiment of a terminal system in accordance with the present disclosure.

FIG. 4 is a conceptual view illustrating one exemplary embodiment of a terminal system in accordance with the present disclosure.

As illustrated in FIG. 4, a terminal system in accordance with one exemplary embodiment includes at least one home appliance 500, a mobile terminal 100, and a navigation device 400. Also, the at least one home appliance configures a home network 600, and the mobile terminal 100 configures the communication network 610 previously described with reference to FIGS. 2A and 2B.

Here, the home network 600 refers to a network constructed in a manner that various home appliances including a refrigerator in the home are connected through wired or wireless network so as to share data together and be mutually controllable, and those home appliances can be remotely controlled anytime and anywhere using an Internet or a mobile terminal through cooperation with an external network. That is, the home network 600 refers to a network which performs not only the remote control of the home appliances but also automatic adjustment and control of different functions, such as information exchange, monitoring and security, by allowing data transmission and reception among those home appliances.

For example, a user can turn on or off a gas range or home appliances outside his or her house, and also reproduce multimedia contents, such as education, movies, games and the like, stored in a sharer located in the home, by use of his or her terminal. Also, the user can check a security state of the house using an intrusion sensor or a wired phone, which constructs a home network, and automatically contact a registered terminal or a fire station when the home network is under an emergency situation.

Meanwhile, the at least one home appliance includes every type of device included in the home network, such as a refrigerator 500*a*, a television 500*b*, an air conditioner/heater 500*c*, a lighting 500*d*, a washing machine 500*e*, a DVD player, a camera and the like.

Home information (or home data) generated from those home appliances may be transmitted to the mobile terminal 100 through the home network 600. The home information which is information generated by the home appliance refers to every type of information transmitted to the mobile terminal 100.

For example, a refrigerator may calculate the number of eggs stored therein, and transmit the calculated number to the mobile terminal as home information. Also, when foodstuffs kept in the refrigerator have past their expiration date, the refrigerator may transmit information related to the expired foodstuffs as the home information to the mobile terminal. Description of the home information will be given in detail with reference to FIGS. 7A to 7C.

Meanwhile, the home information is transmitted from the home appliance which has generated the home information to the mobile terminal 100. The transmission may be allowed by use of at least one of the home network 600 and the communication network 610 according to the terminal system.

The mobile terminal 100 may generate a destination setting command using the received home information. For example, when it receives information indicating the shortage of eggs, the mobile terminal 100 may generate a destination setting command for setting a nearby market at which eggs are sold as a destination. The mobile terminal 100 may then transmit the generated destination setting command to the navigation device 400 located adjacent thereto.

The navigation device 400 may set the destination in response to the destination setting command and start to navigate (guide) the way (a road) toward the set destination. The navigation device 400 refers to a device which guides a route using a map, and may be mounted or provided in a vehicle, for example. Also, the navigation device 400 may be configured as a watch or other types of terminals. That is, even the mobile terminal 100 may also be an example of the navigation device 400 if it is capable of guiding (navigating) a route using a map.

Figure 5:
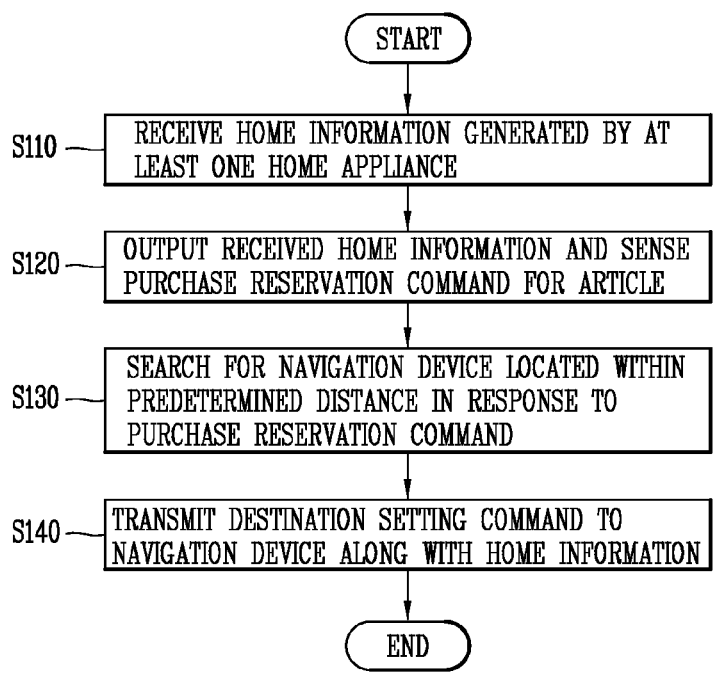
FIG. 5 is a flowchart illustrating a control method for a mobile terminal in accordance with one exemplary embodiment of the present disclosure.

Hereinafter, description will be given in detail of a control method for a mobile terminal according to the present invention in the aforementioned terminal system, with reference to FIG. 5. FIG. 5 is a flowchart illustrating a control method for a mobile terminal in accordance with one exemplary embodiment of the present disclosure.

As illustrated in FIG. 5, according to the control method, a step of receiving home information generated from a home appliance (S110) is carried out. When a preset condition is met, the home appliance may generate home information, and transmit the generated home information to the mobile terminal 100.

The present condition corresponds to a case where there are articles (goods) which are necessary to purchase in the home, and may be variously set according to settings of the home appliances. For example, the preset condition may correspond to a case where expendable supplies such as electric lamps reach their lifespan, a case where oil of a boiler or detergent of a washing machine reaches a shortage level, a case where foods in a refrigerator go bad, and the like.

Next, a step of outputting the received home information and sensing a purchase reservation command for an article (S120) is carried out.

When the home information is received, the controller 180 may output a notification message notifying the reception of the home information in at least one of visual, tactile and audible manners, in response to the received home information. For example, the notification message notifying the reception of the home information may be output on a popup window or an indicator window, along with vibration.

In addition, the controller 180 may output a graphic object, which is provided to sense the purchase reservation command, on the display unit 151, along with the home information. When the display unit 151 is implemented as a touch screen, the controller 180 may sense the purchase reservation command applied by a touch input with respect to the graphic object.

The home information may include an execution command for executing an application associated with the home appliance which has generated the home information. For example, when a refrigerator generates home information indicating a shortage of eggs, the home information may include an execution command for an application associated with the refrigerator. That is, an application, which includes information related to the refrigerator and foodstuffs stored in the refrigerator and can control the refrigerator, may be executed by the home information. The controller 180 may generate a control command for controlling the home appliance based on a user input applied to the application.

Here, the application may be set to request for an input of the purchase reservation command when it is executed. That is, the graphic object may be included in the application, and the controller 180 may sense a purchase reservation input through a touch input applied to the graphic object.

Next, a step of searching for a navigation device located within a predetermined distance in response to the purchase reservation command (S130) is carried out. Then, a step of transmitting the destination setting command as well as the home information to the searched navigation device (S140) is followed.

When the purchase reservation command is sensed, the controller 180 generates the destination setting command, and searches for the navigation device until the generated destination setting command is transmitted to the navigation device.

Here, the controller 180 may search for the navigation device which is located within a communication-available range using the short-range communication module 114. For example, the controller 180 may search for the navigation device using a short-range communication, such as near field communication (NFC).

Once the navigation device is searched for, the controller 180 transmits the destination setting command along with the home information to the searched navigation device. Specifically, upon using the NFC, it may be possible to transmit the destination setting command in a simple manner, such as a Bluetooth manner, without settings between devices.

The navigation device which has received the destination setting command may set a destination using the destination setting command and the home information received along with the destination setting command, and start to navigate toward the destination.

In one embodiment, the controller 180 may generate the destination setting command and search for a destination candidate associated with an article included in the home information. The destination setting command may include information related to the searched destination candidates.

Here, the searched destination candidate may be at least one, and the at least one destination candidate searched may be output on at least one of the display unit 151 and the navigation device. One of the searched at least one destination candidate which is selected by a user input may be set to the destination or one of the searched at least one destination candidate meeting a preset criterion may be set to the destination.

The preset criterion, for example, may be variously set. Examples of the preset criterion may include the closest place from a place at which the navigation device is located, the closest place on the way home, a place of selling a corresponding article with the cheapest price within a predetermined distance based on the place at which the navigation device is located, a place to get with the least gasoline mileage, and the like. The controller 180 may set the destination using data stored in the memory 160 or a server based on the preset criterion.

Since the destination setting command includes information related to the destination, the navigation device may start to navigate to the set destination based on the destination setting command.

In another embodiment, the navigation device other than the mobile terminal may also search for the destination candidate. That is, the navigation device may search for at least one destination candidate using the home information transmitted along with the destination setting command, and display the searched at least one destination candidate. For example, if an article included in the home information is milk, the navigation device may search for places of selling milk based on a place at which the navigation device is located. The navigation device may thus output the searched places as the destination candidates and set one of the searched places as a destination according to a user selection or a preset criterion.

As aforementioned, when home information generated from a home appliance is transmitted to a mobile terminal, the mobile terminal may generate a destination setting command using the home information, and transmit the destination setting command to a searched navigation device. That is, the mobile terminal can output a list of articles (goods, products) necessary to purchase based on information generated from a home network and automatically set a destination associated with the list of articles, which may improve user convenience.

For example, upon receiving home information notifying an article required at home from a home appliance while on duty, the user may check the home information output on the display unit of the mobile terminal and apply a purchase reservation command for the article. After work, when the user rides a car, the mobile terminal may transmit a destination setting command to a navigation device mounted in the car. The user may accordingly pass through a place where the user can purchase the article required at home while driving toward the home or other destination. This may result in improvement of the user's convenience.

Figure 6A:
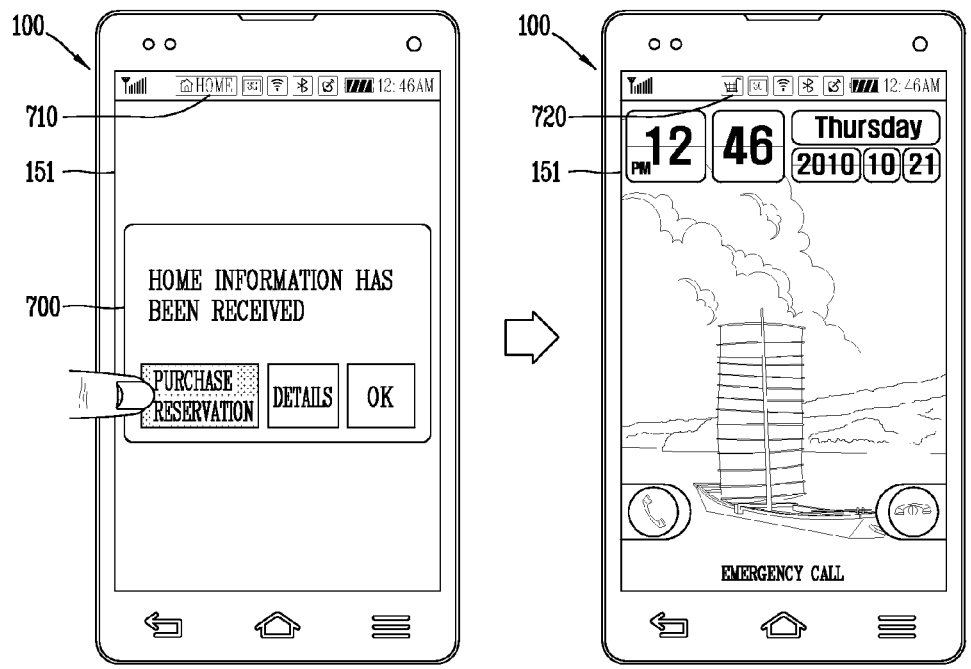
FIGS. 6A and 6B are conceptual views illustrating a mobile terminal disclosed herein, which has received home information from a home appliance.
Figure 6B:
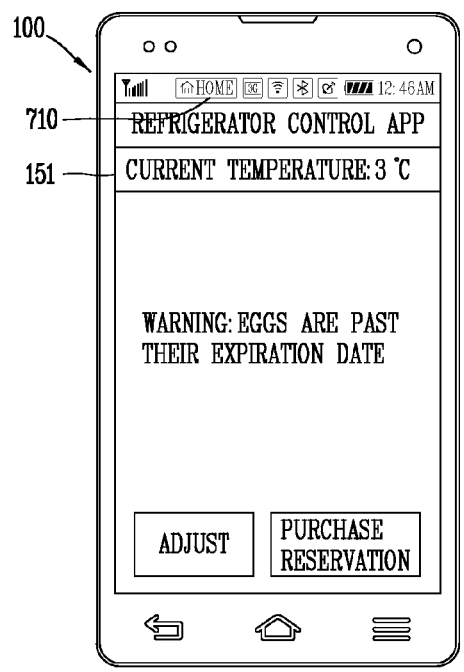

FIGS. 6A and 6B are conceptual views illustrating a mobile terminal disclosed herein, which has received home information from at least one home appliance.

When home information is received from at least one home appliance, the controller 180 may output a notification message notifying the reception of the home information in at least one of visual, tactile and audible manners.

For example, referring to FIG. 6A, similar to receiving a text message, the display unit 151 may output a popup window 700 or output an icon 710 on an indicator window to indicate the reception of the home information.

The controller 180 may also output a graphic object (for example, "purchase reservation") which is configured to sense a purchase reservation command on the display unit 151. The purchase reservation command may be called like this because it is a command for making a reservation such that a navigation device can navigate toward a destination, which is associated with an article. Hereinafter, the terms "purchase reservation" and "purchase reservation command" will be used as the same meaning throughout the detailed description.

When the purchase reservation command is sensed by a touch input, the controller 180 may search for a navigation device which is located within a predetermined distance. The controller 180 may output an icon 720, which indicates that the purchase has been reserved, on an indicator window while searching for the navigation device.

That is, the user may check whether or not the home information has been received and whether or not the purchase has been reserved, by use of the icons 710 and 720, respectively.

Also, when an execution command is included in the home information, the controller 180 may execute an application associated with the home appliance which has generated the home information, based on the execution command. For example, referring to FIG. 6B, when a message indicating that eggs are past their expiration date is received from a refrigerator as home information, an application associated with the refrigerator may be executed. The application may be configured to adjust temperature of the refrigerator using a button, such as "adjust" and manage a database for foodstuffs left in the refrigerator.

Hereinafter, description will be given in detail of home information which is generated by a home appliance, transmitted to the mobile terminal and displayed on the display unit 151.

Figure 7A:
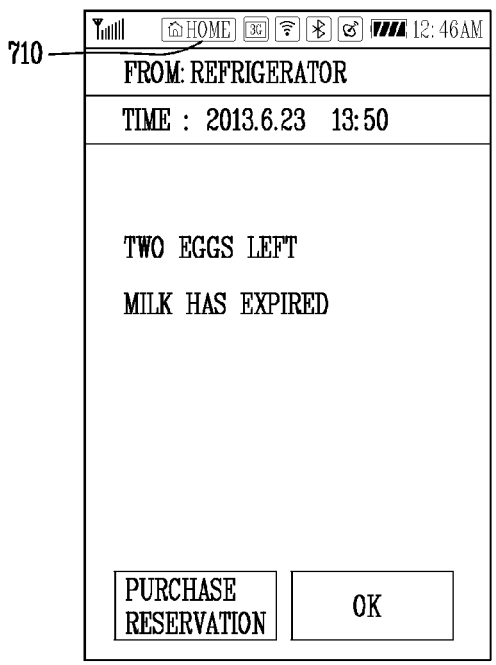
FIGS. 7A to 7C are conceptual views illustrating one embodiment in which a mobile terminal outputs received home information in accordance with the present disclosure.
Figure 7B:
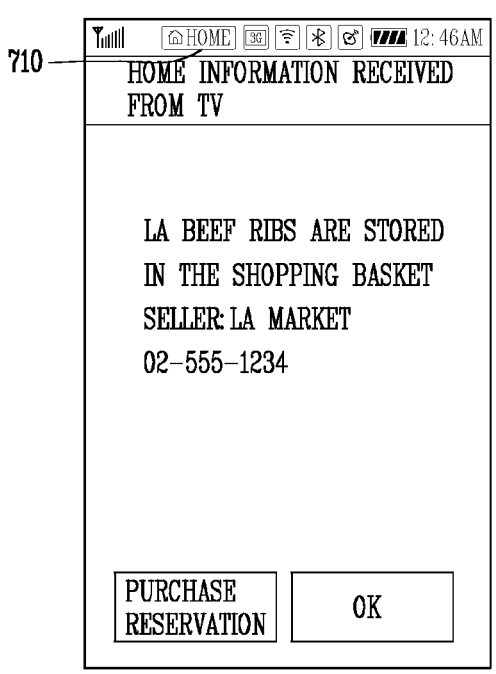
Figure 7C:
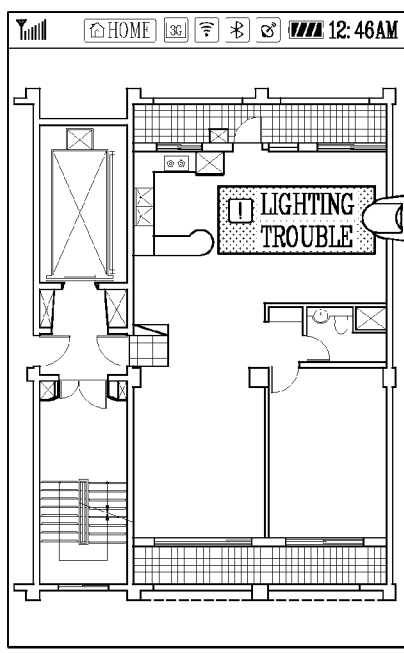
Figure 7C:
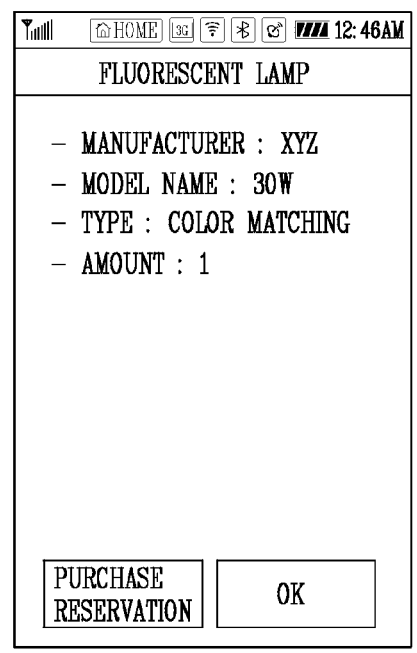

FIGS. 7A to 7C are conceptual views illustrating one embodiment in which the mobile terminal outputs received home information in accordance with the present disclosure. FIGS. 7A to 7C illustrate the display unit 151 of the mobile terminal disclosed herein.

Home information which is information generated by at least one home appliance includes information related to goods (articles, stuffs, or products). The article may be decided in a different manner according to criterion set for each home appliance. Also, the home information may further include information related to the home appliance which has generated the home information and information related to places at which the article can be purchased.

For example, as illustrated in FIG. 7A, a refrigerator may generate home information using foodstuffs kept therein. An amount of a foodstuff kept in the refrigerator is calculated by use of a weight sensor. When the calculated amount is smaller than a reference weight, the corresponding foodstuff may be included in the home information. Also, foodstuffs which are being kept in the refrigerator and expiration date of each foodstuff may be stored in the memory. When a specific foodstuff is past its expiration date, the corresponding foodstuff may be included in the home information.

As another example, as illustrated in FIG. 7B, a user may add an article desired to be purchased in a shopping basket (or a shopping list) while watching a television. The article added to the shopping basket may be included in home information so as to be transmitted to the mobile terminal. Or, a shopping list may be made by using a computer included in a home network. Articles included in the shopping list may be generated as home information.

As another example, referring to FIG. 7C, when expendable supplies which are gotten worn out or become useless as being used reach their lifespan, the expendable supplies may be included in home information. A lighting such as a fluorescent lamp, detergent used in a washing machine, oil use in a boiler, sanitary fittings may correspond to the expendable supplies, and managed by a home appliance which is responsible for the expendable supplies.

Here, the controller 180 may output a drawing associated with the home network on the display unit 151, and output a home appliance which has sent home information in a distinguishing manner from other home appliances. In response to a touch input applied to the home appliance which has sent the home information, the controller 180 may output the drawing such that the user can intuitively check the information related to the home appliance which has generated the home information and a location of an article for which a purchase reservation is required.

Since the home information is output, the user may check the display unit 151 and apply the purchase reservation command. Hereinafter, a control method in which the mobile terminal 100 or the navigation device 400 searches for a destination using the aforementioned home information will be described in detail with reference to FIGS. 8 to 10.

Figure 8:
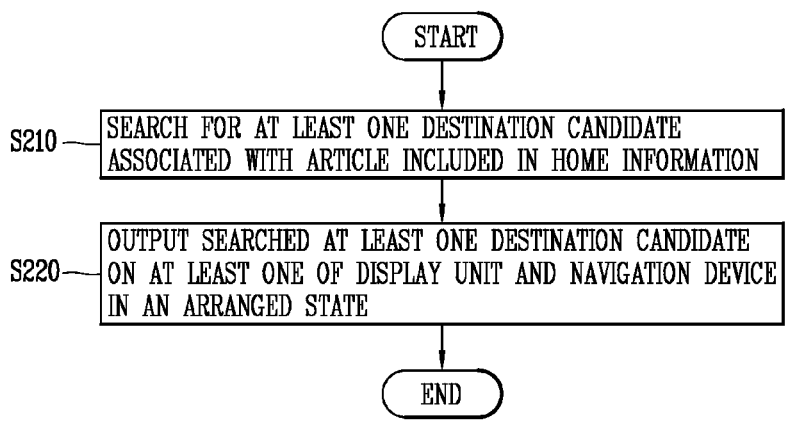
FIG. 8 is a flowchart illustrating a control method for a mobile terminal in accordance with one exemplary embodiment of the present disclosure.
Figure 9:
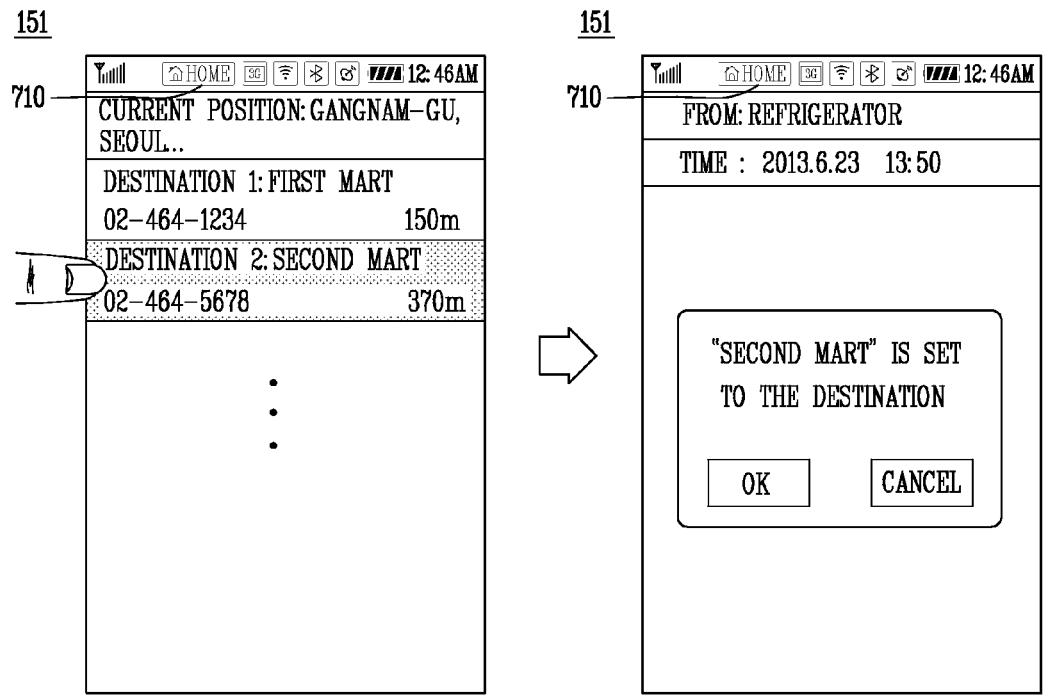
FIG. 9 is a conceptual view illustrating the control method of FIG. 8.

FIG. 8 is a flowchart illustrating a control method for a mobile terminal in accordance with one exemplary embodiment of the present disclosure, and FIG. 9 is a conceptual view illustrating the control method of FIG. 8.

As illustrated in FIG. 8, when a purchase reservation command is sensed in the mobile terminal 100, the mobile terminal may search for at least one destination associated with an article included in home information (S210). The controller 180 may search for a place which may be set to a destination using the home information. For example, when milk is included in the home information, the controller 180 may search for a place at which milk is sold as the destination.

Here, for enhancing user convenience, the step (S210) of searching for the at least one destination may include calculating a location at which a navigation device has been searched for (or detected), and searching for the at least one destination associated with the article based on the calculated location.

Since the navigation device starts to navigate to the set destination in response to a destination setting command, it may be accurate and efficient to search for the destination based on the location at which the navigation device has been detected (searched). That is, it is because the location of the mobile terminal may continuously change even after the purchase reservation command is sensed in the mobile terminal.

Next, the searched at least one destination may be arranged and output on at least one of the display unit and the navigation device (S220).

In response to the search for the at least one destination, a plurality of destination candidates may be searched for. One of the searched destination candidates may be selected by a user or according to a preset criterion, and the selected one destination candidate may be set to the destination. Here, the controller 180 may output the destination candidates as well as the set one destination on the display unit 151 or the navigation device 400.

For example, referring to FIG. 9, the controller 180 may output on the display unit 151 the searched destination candidates (for example, "Destination 1" and "Destination 2") along with information (for example, "current location") related to a place where the mobile terminal 100 is located. Information related to the destination output on the display unit 151 may include at least one of a name, an address, a street and a contact number of the destination.

Here, when one (for example, "Destination 2") is selected from the output destination candidates in response to a user input, the controller 180 may generate a destination setting command with respect to the selected one destination candidate.

The step (S210) of searching for the at least one destination associated with the article included in the home information may be carried out by the navigation device 400 as well as the mobile terminal 100. In this case, the navigation device 400 may search for the at least one destination using the home information which has been sent along with the destination setting command, and then output the searched at least one destination.

Figure 10:
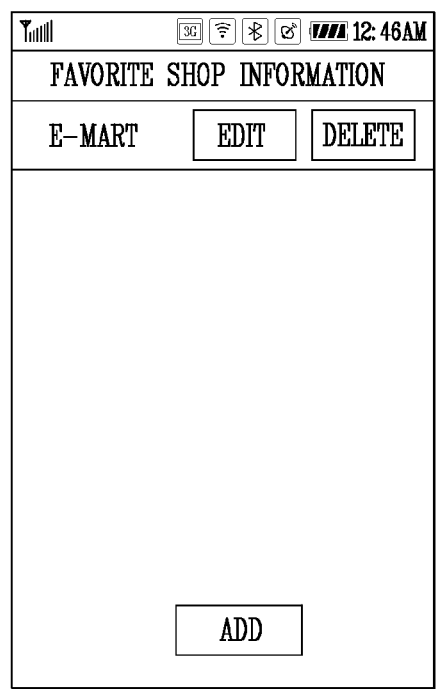
FIG. 10 is a conceptual view illustrating a method by which a mobile terminal searches for a destination using shop information stored in accordance with one exemplary embodiment of the present disclosure.

FIG. 10 is a conceptual view illustrating a method by which a mobile terminal searches for a destination using shop information stored in accordance with one exemplary embodiment of the present disclosure.

The memory 160 may store favorite shop information. The controller 180 may generate a destination setting command using the shop information.

For example, "LG Electronics Agent" which is a place for purchasing electronic products or expendable supplies may be stored as the shop information. When an air conditioner is broken down, the air conditioner may generate home information including a component from which the breakdown occurs, and transmit the home information to the mobile terminal 100. The mobile terminal 100 may output the home information and generate a destination setting command in response to a purchase reservation command. Here, the controller 180 may generate the destination setting command for setting "LG Electronics Agent" located near the mobile terminal 100 as the destination using the shop information stored in the memory 160. When arriving at "LG Electronics Agent," the user may purchase a required article based on the home information output on the mobile terminal 100.

Meanwhile, as illustrated in FIG. 10, the controller 180 may output the shop information stored in the memory 160 on the display unit 151, and output menus for adding, editing or deleting the shop information.

Here, the memory 160 may store different shop information based on home appliances. For example, "LG Display Agent" and "LG Electronics Agent" may be stored as shop information related to a television and a refrigerator, respectively. This may allow for setting and guiding a different destination according to a home appliance generating home information. In addition, it may be possible that each home appliance includes shop information for purchasing a corresponding article in home information, and transmit the home information to the mobile terminal.

Hereinafter, the navigation device in the terminal system according to the one embodiment disclosed herein will be described in detail.

Figure 11:
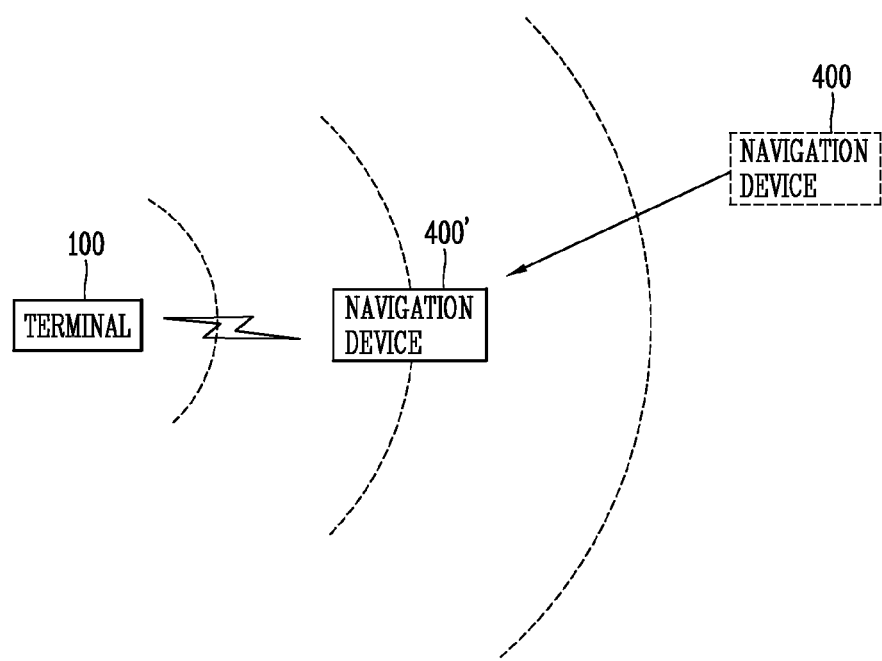
FIG. 11 is a conceptual view illustrating one exemplary embodiment in which a mobile terminal transmits a destination setting command to a navigation device in a terminal system in accordance with the present disclosure.

FIG. 11 is a conceptual view illustrating one embodiment of a mobile terminal which transmits a destination setting command to a navigation device in a terminal system in accordance with the present disclosure.

The mobile terminal 100 searches for the navigation device 400 in response to a purchase reservation command. Here, the controller 180 may search for the navigation device 400 using a short-range communication module. When a navigation device 400' is located within a distance that the mobile terminal is communicatable through the short-range communication module, it may be regarded as the navigation device 400' being searched for. Here, a searchable distance may vary according to the short-range communication module.

When the navigation device 400 is mounted in a vehicle, the navigation device 400 may be controlled by a head unit of the vehicle. Here, the mobile terminal 100 may also transmit personal profile information stored therein, as well as transmitting a destination setting command along with home information.

The personal profile information may refer to setting information for resetting the vehicle. The personal profile information may be stored in the memory of the mobile terminal 100. When a user to which the mobile terminal 100 belongs gets into the vehicle, the mobile terminal 100 may transmit the personal profile information to the vehicle, and then the head unit of the vehicle may reset the settings of the vehicle based on the received personal profile information. That is, the controller 180 may transmit to the vehicle a setting command, which includes the personal profile information, along with the destination setting command.

For example, when the user of the mobile terminal 100 gets into the vehicle, a height and/or an angle of a back of a seat may be reset based on the personal profile information. An angle of a side mirror, an angle of a steering wheel, and the like may be stored as the personal profile information differently according to users.

Since the head unit of the vehicle resets the settings of the vehicle or starts the road guidance (or starts to navigate) toward the destination based on the home information and the personal profile information, the user can smartly control the vehicle using the mobile terminal.

Figure 12:
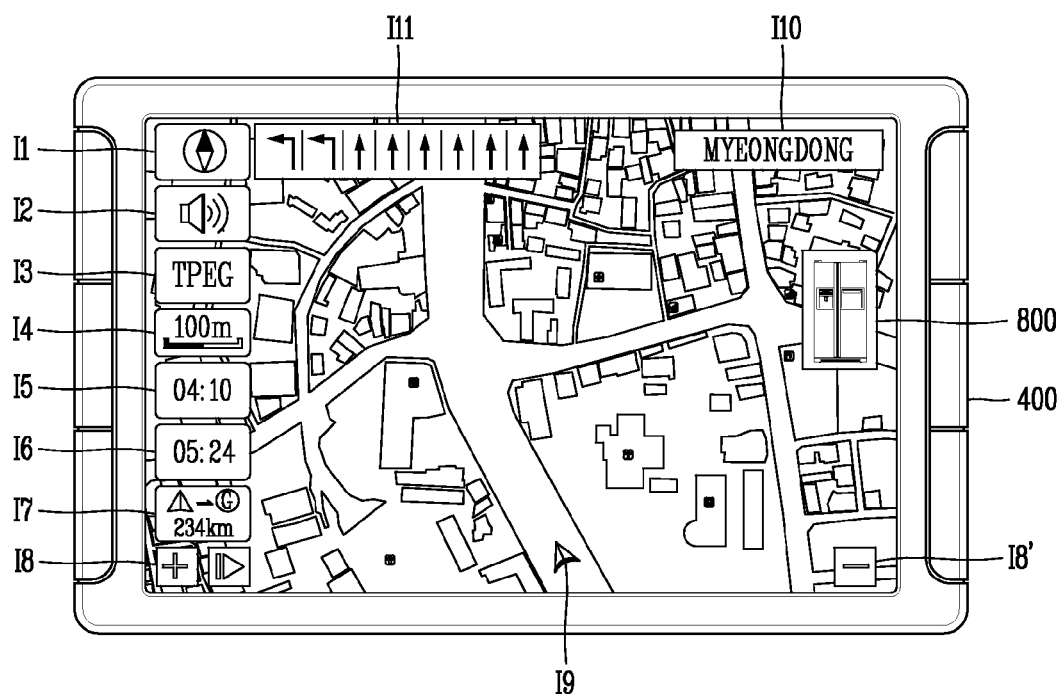
FIG. 12 is a conceptual view illustrating a navigation device in accordance with the present disclosure.

FIG. 12 is a conceptual view illustrating a navigation device in accordance with the present disclosure.

When a screen illustrated in FIG. 12 is implemented into a user-portable form, such as a cellular phone, a smart phone, a notebook computer, a digital broadcast terminal, PDA, PMP and the like, some of components illustrated in FIG. 12 may merely be displayed or all of the components illustrated in FIG. 12 may not be displayed.

As illustrated in FIG. 12, the navigation device 400 may output an icon 11, which indicates an orientation of a displayed map, on one region of a screen. The navigation device 400 may display the map in a manner that a specific direction (for example, a true-north direction of the Earth), an ongoing direction of a moving object, a direction in which a destination is located, and the like are fixedly displayed on one end of the screen.

The navigation device 400 may display an icon 12, which indicates an activation or deactivation of an audio output module 162 and a volume adjustment, on one region of the screen. The user may activate or deactivate the audio output module 162 or adjust the volume in a manner of applying a touch input to the icon 12.

The navigation device 400 may display an icon 13, which indicates an activation or deactivation of a path (route, road) searching function using a transparent portal experts groups (TPEG), on one region of the screen. The TPEG refers to a group for regulating traffic information protocols, established by European Broadcasting Union in 1997, but is widely known as a path guidance function using real-time traffic condition information in a navigation system.

The navigation device 400 may display an icon 14, which indicates a scale of the map data, on one region of the screen.

The navigation device 400 may display an icon 15 which indicates a current time on one region of the screen. Also, the navigation device 400 may display an icon 16, which indicates an estimated arrival time to arrive at a preset destination, on one region of the screen. Besides, an icon which indicates an estimated required time to arrive at a preset destination may also be displayed.

The navigation device 400 may display an icon 17, which indicates a distance left up to a preset destination, on one region of the screen.

The navigation device 400 may display an icon 18 for enlarging the displayed map or an icon 18' for contracting the map on one region of the screen.

The navigation device 400 may display an icon 19, which indicates a location and an ongoing direction of a moving object, on one region of the screen. The icon 19 may be displayed on a point corresponding to a current location of the moving object on the map. The ongoing direction of the moving object indicated by the icon 19 may be displayed to correspond to an apex direction of an arrow or the like.

The navigation device 400 may display an icon 110, which indicates a place name of a region where the moving object is located, on one region of the screen.

The navigation device 400 may display an icon 111, which indicates a lane structure of a roadway when a way where the moving object moves is the roadway, on one region of the screen.

The navigation device 400 may display a route (path) required for arriving at a preset destination 112. The route may not be displayed when a destination of the moving object has not been set.

Also, the navigation device 400 may output an icon (or a point of interest) 800 associated with home information on one region of the screen when receiving a destination setting command from the mobile terminal 100 along with the home information. Here, an image of a home appliance which has generated the home information may be implemented into an icon, to increase user's intuitive power. For example, referring to FIG. 12, a refrigerator image is output in the form of the icon 800, such that the user can intuitively recognize that the home information has been sent from the refrigerator.

When a user input is applied to the icon 800, the navigation device 400 may output the home information generated by the home appliance. The home information, which has been output on the mobile terminal 100, described in FIGS. 7A to 7C, may equally be output on the navigation device 400. Here, the user input may be a voice input or a touch input.

Figure 13A:
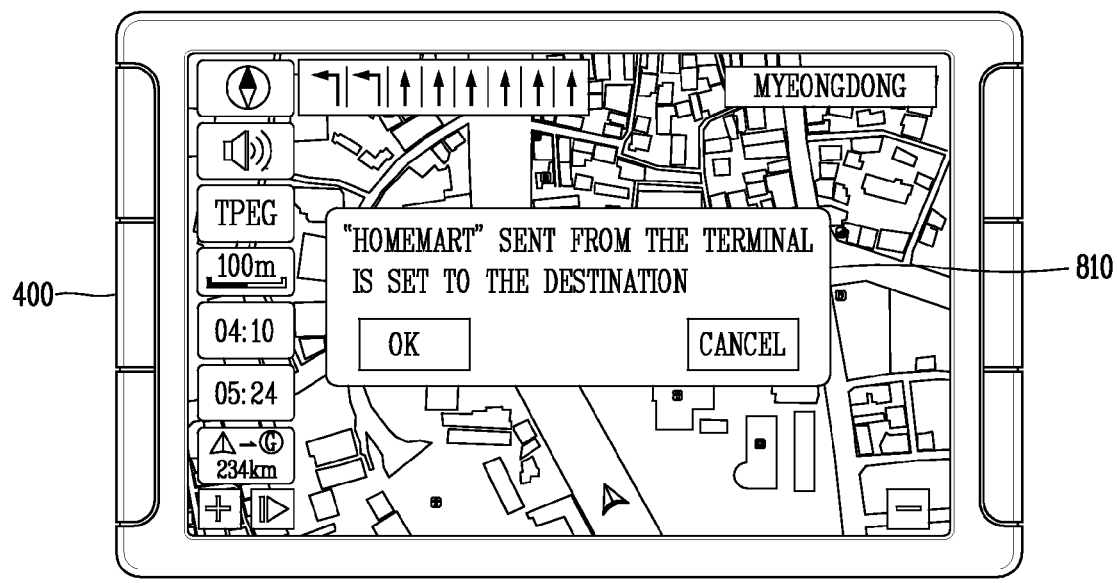
FIGS. 13A to 13C are conceptual views illustrating a navigation device which transmits a response to a destination setting command of a mobile terminal in accordance with the present disclosure.
Figure 13B:
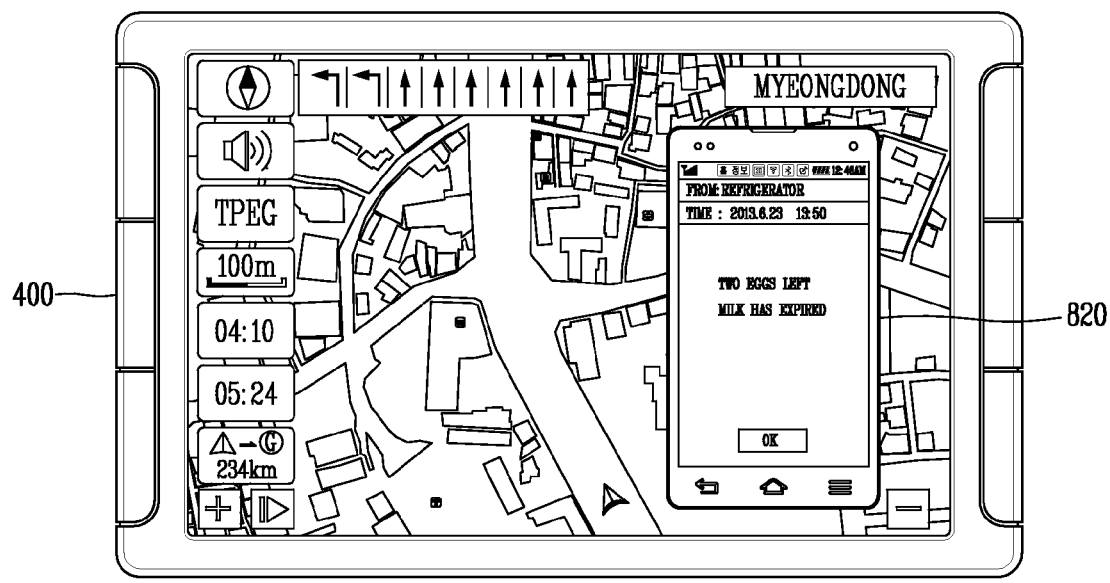
Figure 13C:
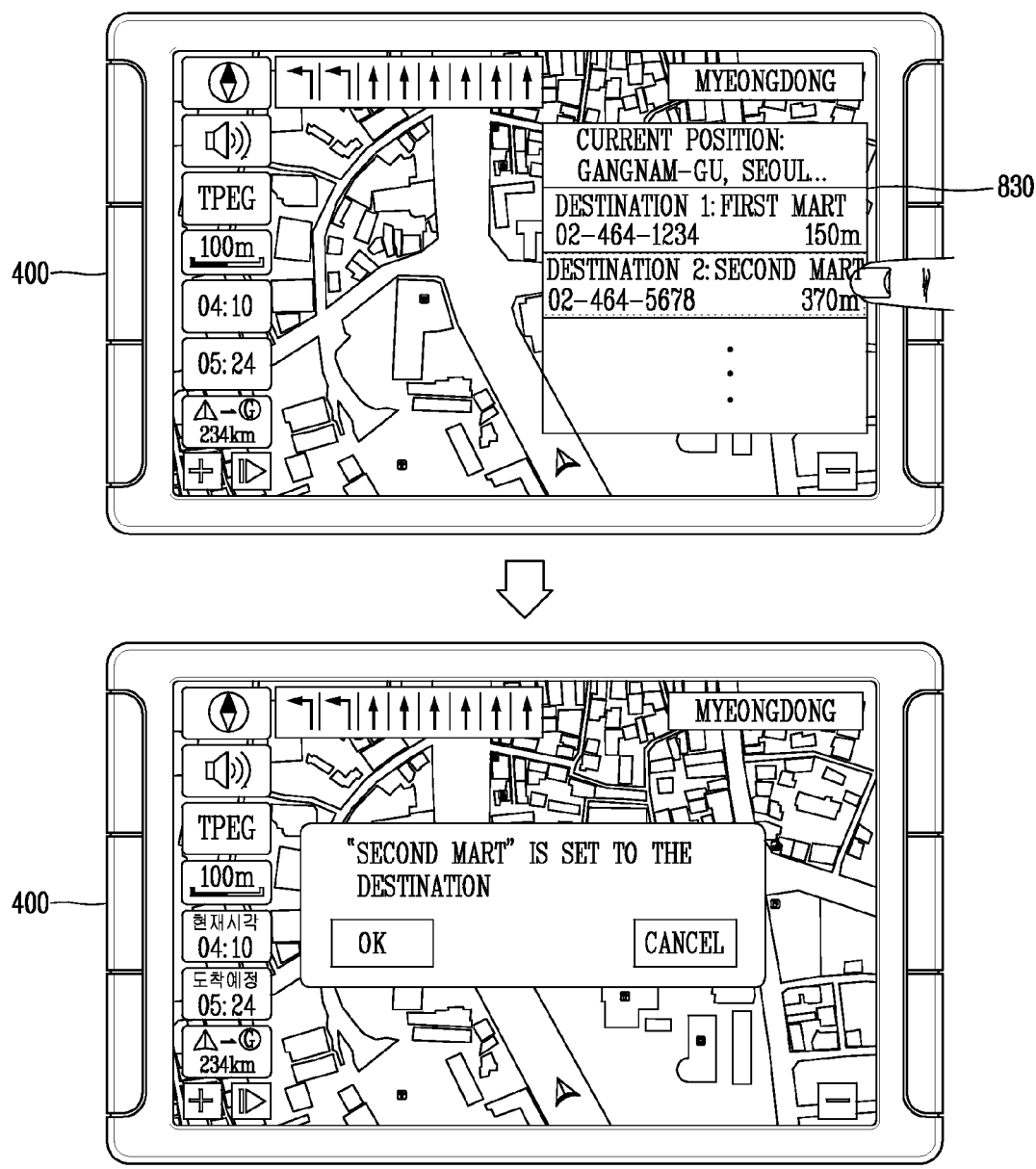

FIGS. 13A to 13C are conceptual views illustrating a navigation device which transmits a response to a destination setting command of a mobile terminal in accordance with the present disclosure.

As illustrated in FIG. 13A, the navigation device 400 may navigate to a destination in response to a destination setting command which has been sent from the mobile terminal. Here, a notification message 810 for notifying the reception of the destination setting command may be output for user's convenience.

As illustrated in FIG. 13B, the navigation device 400 may output home information 820 transmitted from the mobile terminal. That is, the user may check the home information even by the navigation device 400 as well as the mobile terminal.

As illustrated in FIG. 13C, destination candidates which have been searched for by the mobile terminal or the navigation device 400 may be output on the navigation device 400. One of the output destination candidates may be selected as a destination by a user input, and road guidance toward the selected destination may be started.

As described above, a mobile terminal according to the present disclosure may generate a destination setting command using home information, and a navigation device may automatically set a destination and start road guidance. This may allow a user to conveniently use a system in which home appliances, the mobile terminal and the navigation device cooperate together.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The configurations and methods of the mobile terminal in the aforesaid embodiments may not be limitedly applied, but such embodiments may be configured by a selective combination of all or part of the embodiments so as to implement many variations.

INDUSTRIAL AVAILABILITY

The embodiments disclosed herein propose a method for controlling a navigation device in a mobile terminal, and thus may be applicable to various associated industrial fields.

The invention claimed is:

1. A control method for a mobile terminal, the method comprising:
    receiving home information which includes information related to an article and is generated by at least one home appliance;
    outputting the received home information on a display and sensing a purchase reservation command for the article in response to a user input received via the mobile terminal;
    searching for a navigation device that is located within a predetermined distance from the mobile terminal in response to the purchase reservation command, wherein the navigation device is mounted in a vehicle;
    calculating a location at which the navigation device is located when the navigation device is searched;
    searching for a destination associated with the article based on the calculated location;
    transmitting a destination setting command along with the home information to the searched navigation device, such that the searched navigation device sets the destination associated with the article and navigates to the destination in response to the destination setting command;
    storing, in a memory of the mobile terminal, setting information for resetting setting values of the vehicle; and
    transmitting a setting command including the setting information to the vehicle along with the destination setting command, the setting command causing the vehicle to reset the setting values based on the setting information stored in the memory of the mobile terminal.

2. The control method of claim 1, further comprising:
    searching for the destination associated with the article, in response to the purchase reservation command, wherein the destination setting command comprises information related to the searched destination.

3. The control method of claim 2, further comprising:
    storing shop information related to the article in the memory,
    wherein the searching for the destination associated with the article is carried out using the stored shop information.

4. The control method of claim 1, wherein the searched destination comprises at least one destination, and wherein the at least one destination is displayed via at least one of the display or the navigation device in an order arranged based on a distance from the calculated location.

5. The control method of claim 1, wherein the home information further includes an execution command for an application associated with the at least one home appliance, such that the application is executed.

6. The control method of claim 5, wherein the application is set to request for an input of the purchase reservation command upon being executed.

7. The control method of claim 5, further comprising:
    generating a control command for controlling the at least one home appliance using the application.

8. The control method of claim 1, further comprising:
    outputting a notification message to notify the reception of the home information in at least one of visual, tactile, or audible manner in response to the received home information.

9. The control method of claim 1, wherein the destination setting command is transmitted by a short-range communication module.

10. A mobile terminal comprising:
    a display;
    a memory;
    a wireless communication unit; and
    a controller configured to:
        receive home information via the wireless communication unit, wherein the home information includes information related to an article and is generated by at least one home appliance;
        cause the display to display the received home information and search for a navigation device that is located within a predetermined distance from the mobile terminal when a purchase reservation command for the article is sensed in response to a user input received via the mobile terminal, wherein the navigation device is mounted in a vehicle;
        calculate a location at which the navigation device is located when the navigation device is searched;
        search for a destination associated with the article based on the calculated location;
        cause the wireless communication unit to transmit a destination setting command along with the home information to the searched navigation device, such that the navigation device sets the destination associated with the article;
        cause the memory to store setting information for resetting setting values of the vehicle; and
        cause the wireless communication unit to transmit a setting command including the setting information to the vehicle along with the destination setting command, the setting command causing the vehicle to reset the setting values based on the setting information stored in the memory of the mobile terminal.

11. The mobile terminal of claim 10, wherein the controller is further configured to search for the destination associated with the article in response to the purchase reservation command, and
   wherein the destination setting command comprises information related to the searched destination.

12. The mobile terminal of claim 11, further comprising:
   wherein the controller is further configured to:
      cause the memory to store shop information related to the article; and
      search for the destination associated with the article using the stored shop information.

13. The mobile terminal of claim 10, wherein the searched destination comprises at least one destination, and wherein the at least one destination is displayed via at least one of the display or the navigation device in an order arranged based on a distance from the calculated location.

14. The mobile terminal of claim 10, wherein the controller is further configured to cause the display to display a graphic object when the home information is received, and
   wherein the purchase reservation command is sensed when a touch input is applied to the graphic object.

15. The mobile terminal of claim 10, wherein the controller is further configured to output a notification message to notify the reception of the home information in at least one of visual, tactile, or audible manner in response to the received home information.

16. The mobile terminal of claim 10, wherein the wireless communication unit comprises a short-range communication module, and the controller is further configured to transmit the destination setting command via the short-range communication module.

17. The mobile terminal of claim 10, wherein the at least one home appliance configures a home network and the mobile terminal configures a communication network that is not the same as the home network.

18. The mobile terminal of claim 10, wherein the navigation device communicates directly with the mobile terminal while the navigation device does not communicate directly with the at least one home appliance.

19. A communication system in which at least one home appliance, a mobile terminal and a navigation device are connected in a wireless manner,
   wherein the at least one home appliance is configured to generate home information including information related to an article according to a preset criterion,
   wherein the mobile terminal is configured to:
      receive the home information generated by the at least one home appliance;
      display the received home information on a display and sensing a purchase reservation command for the article in response to a user input received via the mobile terminal;
      search for a navigation device that is located within a predetermined distance from the mobile terminal in response to the purchase reservation command;
      calculate a location at which the navigation device is located when the navigation device is searched;
      search for a destination associated with the article based on the calculated location; and
      transmit to the navigation device a destination setting command along with the home information, and
   wherein the navigation device is configured to set the destination associated with the article and start to navigate to the destination associated with the article in response to the received destination setting command,
   wherein the navigation device is mounted in a vehicle, and
   wherein the mobile terminal is further configured to:
      store, in a memory of the mobile terminal, setting information for resetting setting values of the vehicle; and
      transmit a setting command including the setting information to the vehicle along with the destination setting command, the setting command causing the vehicle to reset the setting values based on the setting information stored in the memory of the mobile terminal.

* * * * *